L. MARSEILLE & P. GOUIN.
ELECTRIC ACCUMULATOR.
APPLICATION FILED MAR. 28, 1910.
966,033.
Patented Aug. 2, 1910.
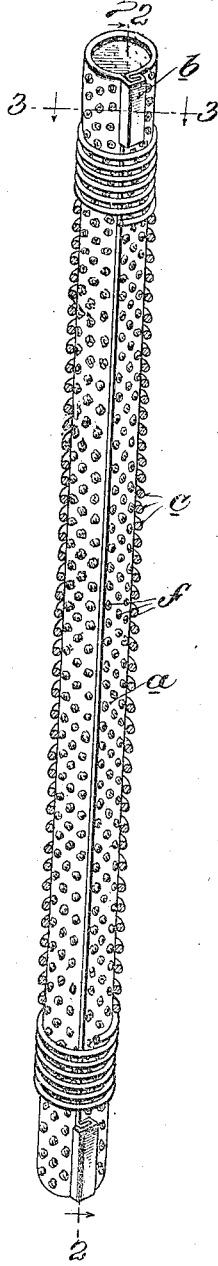
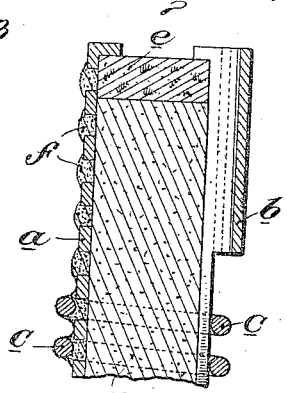
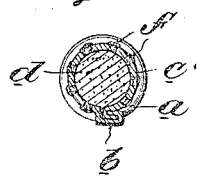
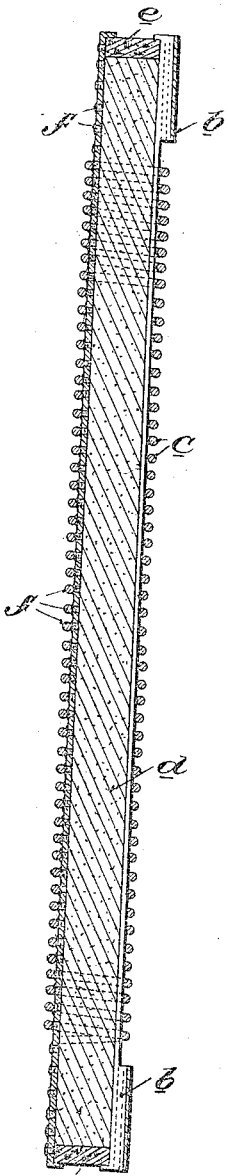
Witnesses
Frederick A. Holton
M. A. Wood
Inventors
Léon Marseille
Paul Gouin
By Munn Cameron Lewis & Massie
Attorneys

UNITED STATES PATENT OFFICE.

LÉON MARSEILLE, OF PARIS, AND PAUL GOUIN, OF LEVALLOIS-PERRET, FRANCE.

ELECTRIC ACCUMULATOR.

966,033.   Specification of Letters Patent.   Patented Aug. 2, 1910.

Original application filed July 1, 1909, Serial No. 505,458. Divided and this application filed March 28, 1910. Serial No. 551,981.

*To all whom it may concern:*

Be it known that we, LÉON MARSEILLE, of Paris, France, and PAUL GOUIN, of Levallois-Perret, Seine, France, have invented a new and useful Improvement in Electric Accumulators, which invention is fully set forth in the following specification.

It is well known that the dropping of the active material from alkaline accumulator elements has a very detrimental effect upon the action of the accumulators, shortening their life and reducing the difference of potential at discharge. Every precaution should therefore be taken to prevent the dropping out of the active material and, which is a further advantage, to construct electrodes which will not become distorted during the forming of the element and under the action of charging and discharging. It is known, for example, that when a positive element is formed with hydroxids of nickel, a considerable increase occurs in the volume of the active material, and that if the material is not held in place by a well devised mechanical arrangement, it will burst or distort its casing.

According to the present invention, in order to prevent the dropping of the active material, the exterior of the electrodes, supports, pockets, perforated or woven wire tubes or the like, before the same are filled with active material, is provided with a deposit of sesquioxid of nickel by means of a solution of nitrate of nickel, until a hard, adherent and porous layer of sesquioxid is obtained. This sesquioxid closes perfectly the smallest interstices, orifices, etc., in the pockets or tubes and consequently prevents dropping of the active material without at the same time introducing too much internal resistance, this oxid being a sufficiently good conductor when anhydrous and suitably heated.

This oxid layer may be formed, for example, by plunging the support into a concentrated solution of nickel nitrate of about 36° Baumé rendered slightly acid and then passed into a furnace heated to about 600° C. to effect the formation of sesquioxid of nickel $Ni_2O_3$. According to the thickness desired, this operation may be repeated more or less times. This method may be likewise employed, moreover, for insoluble positive or negative electrodes alone or concurrently with soluble electrodes.

The oxid deposited in layers upon the electrodes according to this process presents the advantage of appreciably increasing the capacity of the electrodes, its own capacity being added to that of the active material. The object sought is obtained with greater advantage if the alkaline accumulator electrode is made as about to be described with reference to the accompanying drawing, in which:

Figure 1 is an elevation, Fig. 2 a section, and Fig. 3 a plan of the skeleton of the electrode. Fig. 4 is a magnified detail view showing the oxid layer in position.

The electrode is formed of a perforated cylindrical tube $a$ of nickel or any other metal or alloy fulfilling the same object. The tube $a$ is made from a sheet of, say, nickel perforated with a large number of holes of any desired shape and size. The sheet is bent into tubular form and its two edges brought flush together to enable them to be kept in place. At top and bottom, the ends of the sheet have non-perforated tongues or extensions $b$, which are hooked and clamped together. The tube may be made in any other desired way. A double wire of nickel, iron, or the like $c$, previously twisted together, is wound in very close coils around the tube, so as to form a bracing which will insure great strength for the electrode. The wire may of course be single, if desired, or it may be triple or multiple and twisted together or not, and of any desired section. The two ends of the wire may be fixed under the hooks or tongues $b$ or secured in any other way. The tube thus prepared is oxidized according to the process above described so as to close the holes and the interstices of the bracing with sesquioxid of nickel $f$, which also cements the wire to the electrode casing. It is then filled with positive or negative active material $d$ and is closed at top and bottom by ebonite plugs $e$ which are retained in place by bending over the edges of the tube.

The process herein disclosed forms the subject-matter of our application Serial No. 505,458, filed July 1st, 1909, of which the present application is a division, and is therefore not claimed herein.

What is claimed is:

1. An accumulator electrode comprising a metal cylinder for the reception of an active material, said cylinder having its walls perforated and the perforations filled with a porous deposit of sesquioxid of nickel which is adherent to the walls of the cylinder, and is adapted to prevent dropping of the active material.

2. An accumulator electrode comprising a perforated metal cylinder for the reception of an active material, a coil of wire surrounding said cylinder and reinforcing the same, and a deposit of nickel sesquioxid filling said perforations and cementing the wire to said cylinder.

3. An accumulator electrode, a support for active material formed of perforated sheet metal bent into tubular form and having tongues for locking the edges of the sheet together, a coil of wire surrounding said cylinder for reinforcing the same, and a deposit of sesquioxid of nickel closing said perforations and cementing said wire to the cylinder.

In testimony whereof we have signed this specification in the presence of two subscribing witnesses.

LÉON MARSEILLE.
PAUL GOUIN.

Witnesses:
   DEAN B. MASON,
   GABRIEL BELLIARE.